United States Patent [19]

Tassicker

[11] 4,400,971
[45] Aug. 30, 1983

[54] METHOD AND MEANS FOR MEASURING PARTICULATE MATTER ON A FILTER

[75] Inventor: Owen J. Tassicker, Cupertino, Calif.

[73] Assignee: Electric Power Research Institute, Inc., Palo Alto, Calif.

[21] Appl. No.: 268,279

[22] Filed: May 29, 1981

[51] Int. Cl.³ .................... B01D 46/00; G01D 21/00
[52] U.S. Cl. ........................................ 73/28; 55/270; 324/61 R; 340/607
[58] Field of Search ................... 73/28; 324/61 R; 340/607, 608; 55/215, 270, 274

[56] References Cited
U.S. PATENT DOCUMENTS

| | | | |
|---|---|---|---|
| 3,221,248 | 11/1965 | Batteau et al. | 324/61 R X |
| 3,502,970 | 3/1970 | Thayer | 324/61 R |
| 4,134,063 | 1/1979 | Nicol et al. | 324/61 R |
| 4,183,029 | 1/1980 | Isayama et al. | 340/607 X |

Primary Examiner—James J. Gill
Attorney, Agent, or Firm—Flehr, Hohbach, Test, Albritton & Herbert

[57] ABSTRACT

The amount of particulate matter deposited on a fabric filter during operating conditions is determined by capacitive measurements. The fabric filter material is mounted on a first perforated electrode and a second electrode is spaced from the first electrode and capacitively associated therewith. Capacitance between the electrodes varies with the amount of particulate matter on the filter. Bridge circuitry is employed to determine the capacitance between the electrodes.

7 Claims, 7 Drawing Figures

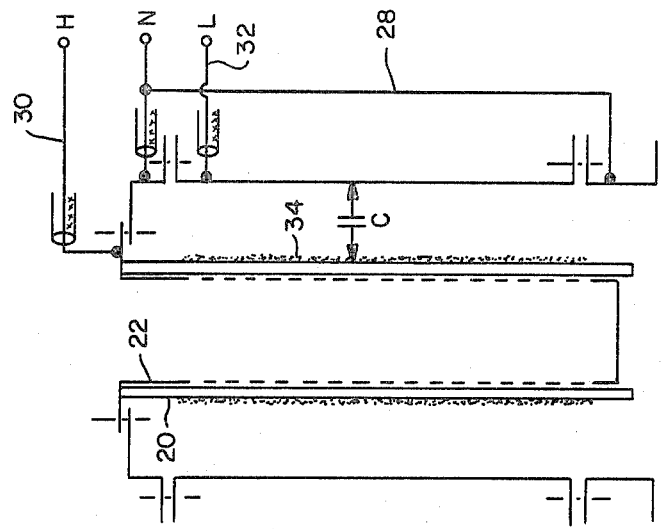
FIG.—3
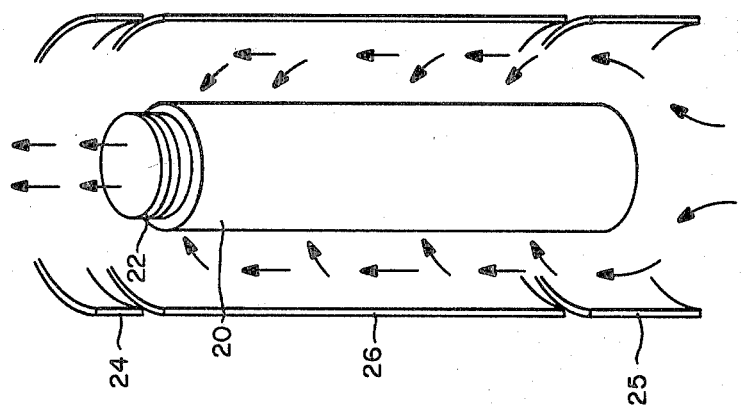
FIG.—2
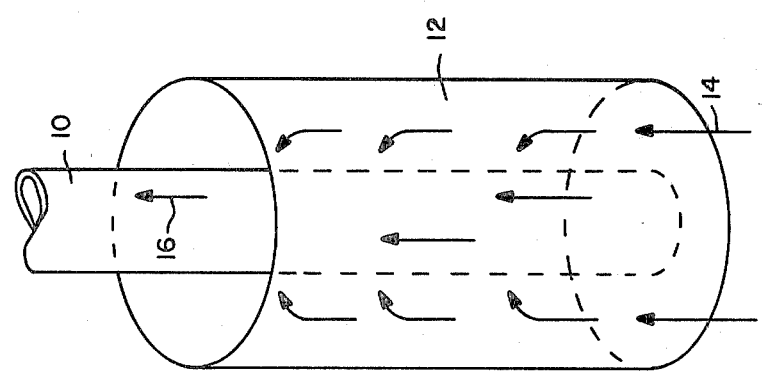
FIG.—1

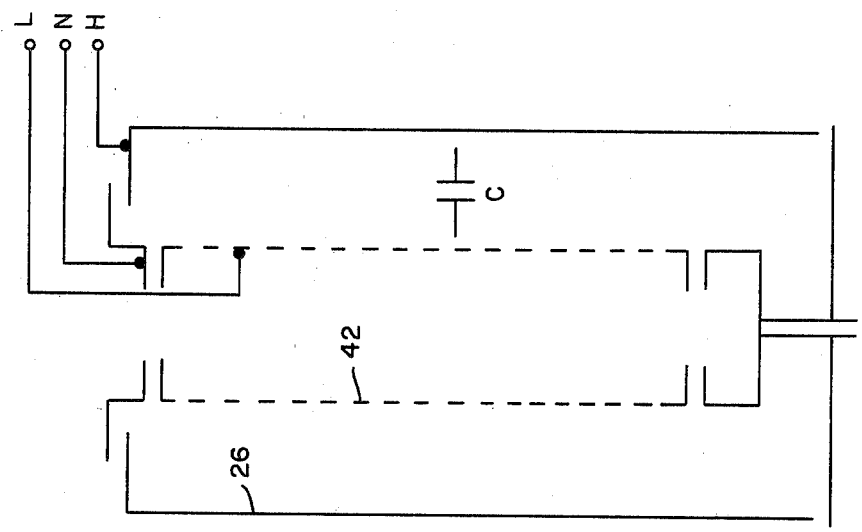
FIG.—5
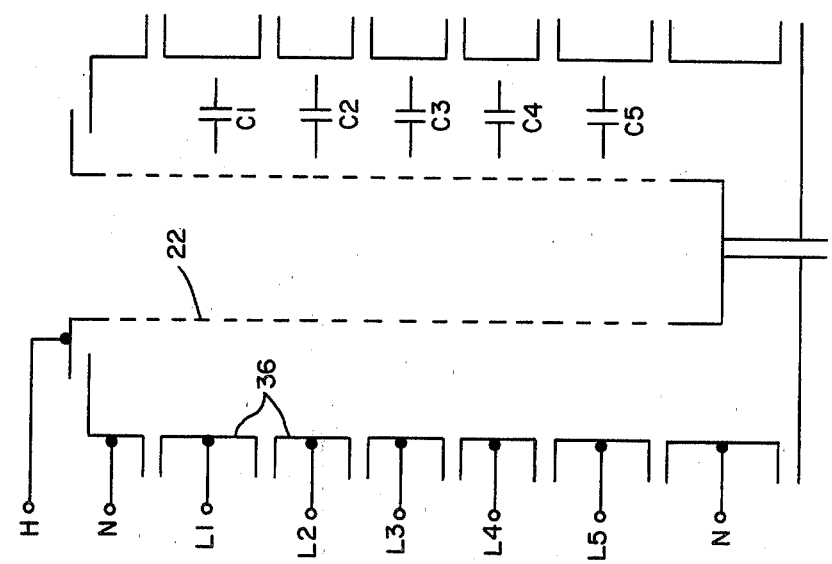
FIG.—4

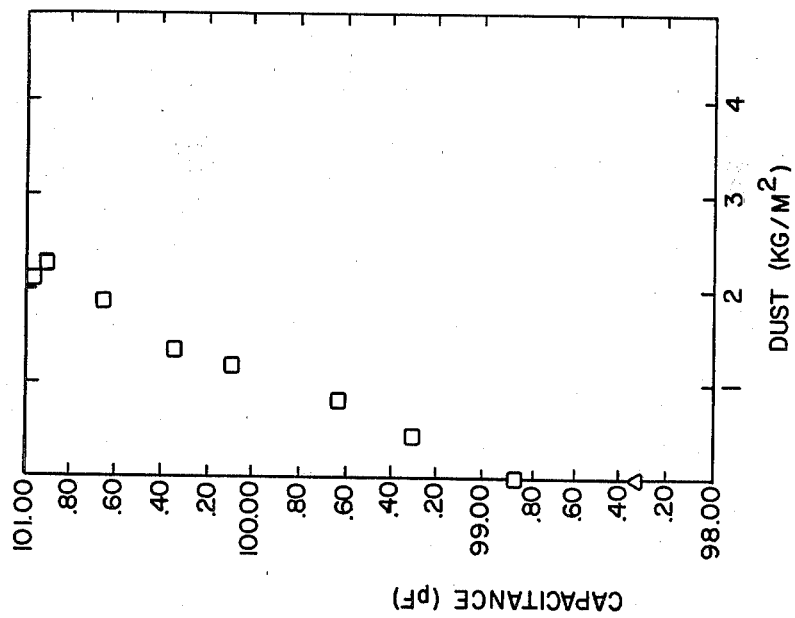
FIG.—7
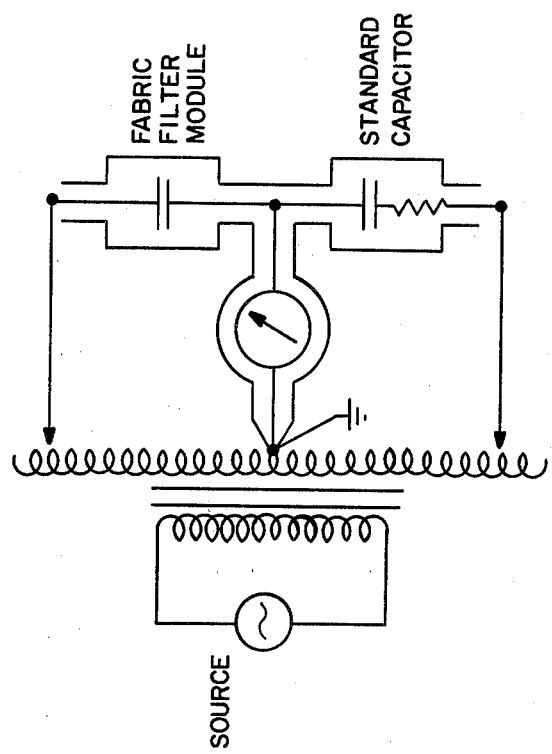
FIG.—6

METHOD AND MEANS FOR MEASURING PARTICULATE MATTER ON A FILTER

This invention relates generally to particulate precipitators and filters as used in removing particles from flue gases produced by combustion and other industrial processes, and more particularly the invention is directed to structures and methods for measuring the amount of particulate adhering to filters under operating conditions.

Fabric filter modules are commonly employed to remove particulate matter from exhaust gases for pollution control purposes and in combined cycle thermal systems for protecting gas turbine blades from erosion and particulate deposition. Such fabric fiber filters typically comprise a plurality of tubes in parallel with the flow of gases directed axially through the filters to remove the particulate matter. Such gases are generally at 150°–250° C. at an atmospheric pressure, in which case the fibers comprising the bags are polyester, acrylic, or glass. For pressurized fluidized bed combustion, the gas pressure may be between 5 to 15 atmospheres and the temperature about 900° C., in which gas the bags are made of ceramic fibers. The particles to be captured vary in size from 0.2 micron to 20 micron and can weigh in total up to 10 parts per thousand of the weight of gas. When the deposit of particulate matter on a bag increases to 2 or 3 millimeters, the pressure drop steadily rises and the bags must be cleaned by shaking, reverse gas flow, or pressure pulse.

The overall particle collection efficiency of fabric fiber modules is expected to be 99%+. Accordingly, the modules must be periodically cleaned to ensure such collection efficiency. However, the cleaning cycle can produce physical abrasion of fibers, and the bag life is adversely affected by excessive cleaning. On the other hand, pressure drop causes a serious power loss in the system. Moreover, reverse gas flow or pulse jet cleaning requires an extensive pumping system with more energy losses. Moreover, the particulate matter may deposit on the bags unevenly and may detach unevenly during cycles. Pressure drop measurements are thus a poor indication of mass loading or of particle deposition on the filter surfaces.

Accordingly, an object of the present invention is an improved method of determining the amount and distribution of particle deposition on a filter surface.

Another object of the invention is structure for capacitively determining the amount of particle matter on a filter surface.

A feature of the invention is the use of capacitive measuring techniques to determine the amount of particulate matter on a filter.

Briefly, in accordance with the invention, a fabric filter module includes a first conductive means with fabric filter material mounted on the first conductive means, a second conductive means spaced from the first conductive means, and means electrically contacting the first and second conductive means whereby capacitance between the first and second conductive means can be determined.

The amount of particulate material on the fabric filter can be determined during operating conditions by measuring the capacitance in suitable bridge circuitry between the first conductive means and the second conductive means.

In accordance with one embodiment the first conductive means comprises a first perforated electrode on which the fabric material is mounted, and the second conductive means comprises a second electrode spaced from and associated with one end of the first electrode and a third electrode spaced from and associated with another end of the first electrode. A fourth electrode is placed between the second and third electrodes which is spaced from and associated with the first electrode.

In accordance with another embodiment of the invention the fourth electrode may comprise a plurality of electrodes whereby capacitance can be measured using each of the plurality of electrodes and the first electrode and thereby determining the particulate matter positioned along the length of the fabric filter. Alternatively, the first electrode may comprise a plurality of electrodes spaced along the length of the fabric filter, and the axial distribution of the particulate material can be determined by measuring the capacitance between each of the first electrodes and the fourth electrode.

The invention and objects and features thereof will be more readily apparent from the following detailed description and appended claims when taken with the drawing, in which:

FIG. 1 is a perspective view of a fabric filter module.

FIG. 2 is a perspective view of a fabric filter module in accordance with one embodiment of the present invention.

FIG. 3 is a section view of the fabric filter module of FIG. 2.

FIG. 4 is a section view of a fabric filter module in accordance with another embodiment of the invention.

FIG. 5 is a section view of a fabric filter module in accordance with another embodiment of the invention.

FIG. 6 is an electrical schematic of a bridge circuitry for determining the capacitance of a fabric filter module in accordance with the invention.

FIG. 7 is a plot of capacitance versus dust particulate density on a filter in accordance with the invention.

Like elements in the several figures have the same reference numerals.

Referring now to the drawings, FIG. 1 is a perspective view of a fabric filter module 10 which is placed in an exhaust line 12 whereby dirty gases 14 flowing into the chamber 12 pass through the fabric material of the filter 10 and through the perforated electrode 22. It will be appreciated that a plurality of such modules may be in the exhaust line with the modules operating in parallel. Particulate matter in the dirty gas 14 is captured by the fabric material about the filter 10 with the clean gas 16 exiting through a central opening in the filter 10. As above described, flue gases are typically at 150° C. to 250° C. and at atmospheric pressure, and the fibers of the fabric filter may comprise polyester, acrylic, or glass. For pressurized fluidized bed combustion the gas pressure may be in the range of 5–15 atmosphere and the temperature on the order of 900° C. In this latter application the fabric material may comprise ceramic fibers.

As further discussed above, the overall particle efficiency of a fabric filter is expected to be 99%+, and to maintain such efficiency the fabric filters must be periodically cleaned. In order to ensure adequate cleanliness of the fabric filter without the detrimental effects of excessive cleaning a fabric filter module in accordance with the present invention is constructed whereby the particulate matter can be determined during operating conditions by capacitance measuring techniques. FIG. 2 is a perspective view partially in section of a fabric filter in accordance with the present invention in which the fabric material 20 is mounted about a perforated metal support 22. Positioned about the fabric filter in association with one end thereof is a second electrode 24, and positioned about another end of the filter is a third electrode 25. A fourth electrode 26 is positioned between the electrodes 24 and 25 in association with the first electrode 22. In one embodiment the electrodes 24, 25, and 26 are cylindrical and preferably have a size 1.5 to 5 times that of the inner electrode 22. Electrode 24 and 25 are electrically connected and function as a single electrical unit to eliminate end effects, fringing, and stray lead capacitance. Elements 22, 26, and 24–25 constitute a three terminal capacitor whose properties may be exactly measured by techniques known to those skilled in the art. It is apparent to those conversant with the art of measuring capacitance of such electrode assemblies, that procelain, ceramic or other insulating material must be used to separate electrodes 22, 24, 25 and 26.

FIG. 3 is a section view of the fabric filter module of FIG. 2 further illustrating the fabric material 20 about the first electrode 22 with the second, third and fourth electrodes 24, 25 and 26 spaced therefrom. In this embodiment the electrodes 24 and 25 are connected to ground through a suitable coaxial conductor 28. Coaxial conductor 30 is connected to the first electrode within the fabric filter module, and coaxial conductor 32 is connected to the fourth electrode associated with the electrode 22. As will be described further hereinbelow, known bridge circuitry can be connected to the conductive lines 28, 30, 32 whereby the capacitance designated C between the electrode 22 and electrode 26 can be determined.

Importantly, the capacitance between electrodes 22 and 26 is dependent of the amount of particulate matter 34 on the surface of the fabric material 20. The effect of fly ash on the dielectric constant and thus the capacitance of the electrodes is discussed by Tassicker in "The Temperature and Frequency Dependence of the Dielectric Constant of Power Station Fly Ash", *Staub-Reinhalt Luft*, Vol. 31, No. 8, August 1971.

Since the particulate matter may deposit unevenly along the length of the fabric filter, the electrode 26 can be replaced by a plurality of electrodes 36, as illustrated in FIG. 4, whereby the measured capacitance between each of the electrodes 36 and the electrode 22 can provide the particulate distribution along the axial length of the fabric filter associated with each electrode 36. Alternatively, as illustrated in FIG. 5, the inner electrode 22 can be replaced by a plurality of electrodes 42, and the particulate matter along the length of the fabric filter can be determined by measuring the capacitance between each of the electrodes 42 and the electrode 26.

By means of a suitable audio or radio frequency transformer-ratio bridge, as typically illustrated in FIG. 6, four or five figure resolution of capacitance changes is easily obtained. Such bridge circuitry is described by McGregor et al in "New Apparatus at the National Bureau of Standards for Absolute Capacitance Measurement", *IRE Transactions on Instrumentation*, Vol. I-7, Nos. 3 and 4, December 1958. By considering the electrodes in the apparatus of FIGS. 2–5 as three terminal capacitors and interconnecting the three terminal capacitor in one leg of the bridge in FIG. 6, the capacitance can be determined by the amount of capacitance required in the other leg of the bridge to bring the circuitry into balance. Another description of a satisfactory 3-terminal capacitive determination is "Self Balancing Transformer Ratio Arm Bridges", R. Calvert and J. Mildwater, *Electronic Engineering*, Vol. 35, No. 430, December 1963, pp. 782–787.

Tests of the invention have proved the utility thereof in determining particulate concentration on a fabric filter with 0.62 $M^2$ collection area. Test results demonstrated a linear relationship between the mass of deposited particulate matter and incremental capacitance as shown in the plot of FIG. 7. Insertion of a commercial woven ceramic fibre cloth over electrode 22 resulted in a measurable but negligible increase in capacitance over that of the bare metal electrodes. As a measured quantity of dusty gas was introduced to the chamber and passed through the cloth, the dust deposit resulted in a regular increase in capacitance. Thus, a fabric filter can be monitored during operation conditions by measuring the capacitance whereby the filter can be timely cleaned to ensure efficient operation of the filter.

The invention has applicability in exhaust lines of combustion systems and in combined thermal cycle systems. While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A method of determining the amount of particulate matter on a fabric filter comprising the steps of
   providing a first electrode on which said fabric filter is mounted,
   providing a second electrode in association with one end of said first electrode, providing a second electrode in association with another end of said first electrode, and providing a plurality of fourth electrodes between said second and third electrodes and in association with said first electrode, and
   determining the capacitance between said first electrode and said plurality of fourth electrodes.

2. The method of determining the amount of particulate matter on a fabric filter as defined by claim 1 wherein said step of providing first electrode includes providing a plurality of first electrodes on which said fabric filter is mounted.

3. The method of determining the amount of particulate matter on a fabric filter as defined by claim 1 wherein said step of determining capacitance comprises the steps of connecting said first electrode and said fourth electrode in bridge circuitry and capacitively balancing said bridge circuitry.

4. A fabric filter module for removing particulate matter in a gaseous fluid and which allows the determination of the amount of particulate matter deposited on said filter under operating conditions comprising a first conductive means including a first perforated electrode and filter support, fabric filter material mounted on said first conductive means, second conductive means spaced from said first conductive means, and means electrically contacting said first and second conductive means whereby capacitance between said first and second conductive means can be determined.

5. The fabric filter module as defined by claim 4 wherein said second conductive means comprises a second electrode in association with one end of said first electrode, a third electrode in association with another end of said first electrode, and a fourth electrode between said second and third electrodes and associated with said first electrode.

6. The fabric filter module as defined by claim 5 wherein said fourth electrode comprises a plurality of electrodes whereby capacitance can be determined between each of said fourth electrodes and said first electrode.

7. The fabric filter module as defined by claim 4 wherein said first electrode includes a plurality of electrodes on which said fabric filter is mounted and said second conductive means comprises a second electrode spaced from and associated with each of said first electrodes.

* * * * *